(No Model.)
M. B. HELLER.
HEEL SWEEP ATTACHMENT.
No. 411,440. Patented Sept. 24, 1889.
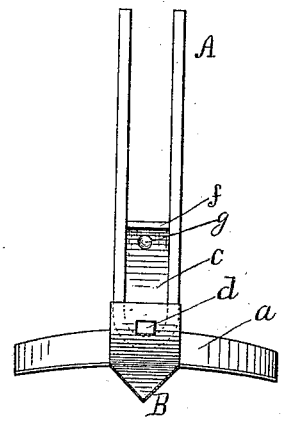
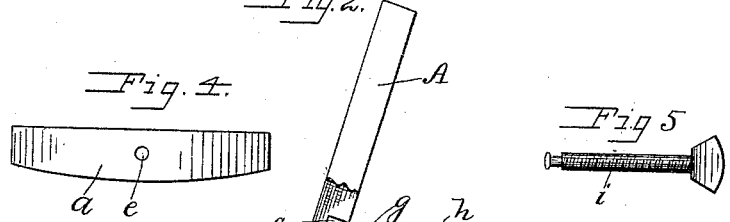
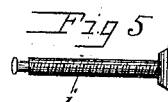
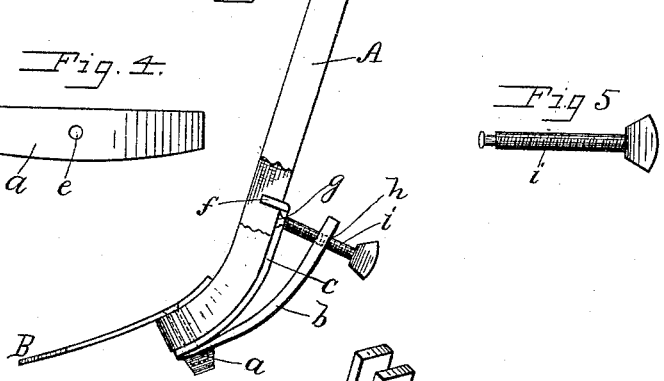
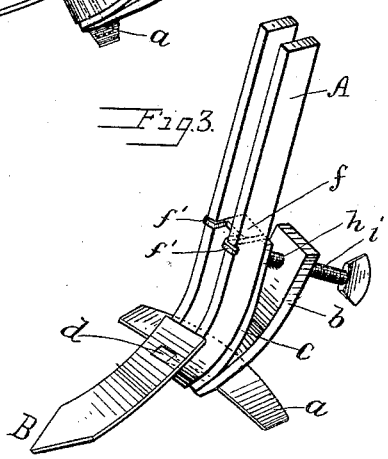
Witnesses
R. A. Balderson
M. E. Lansdale
Inventor
Mikajah B. Heller
By J. S. Duffie
Attorney

UNITED STATES PATENT OFFICE.

MICAJAH BOMAN HELLER, OF BROYLES, SOUTH CAROLINA.

HEEL-SWEEP ATTACHMENT.

SPECIFICATION forming part of Letters Patent No. 411,440, dated September 24, 1889.

Application filed October 25, 1888. Serial No. 289,116. (No model.)

*To all whom it may concern:*

Be it known that I, MICAJAH BOMAN HELLER, a citizen of the United States, residing at Broyles, in the county of Anderson and State of South Carolina, have invented certain new and useful Improvements in Heel-Sweep Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to heel-sweeps; and it consists in the novel construction and arrangement of its parts, hereinafter described.

In the accompanying drawings, Figure 1 is a front view of the plow-standard, with a plow-point and my heel-sweep and heel-sweep attachment secured thereto. Fig. 2 is a side elevation of Fig. 1. Fig. 3 is a perspective view of Fig. 1. Figs. 4 and 5 are detail views.

My invention is designed mainly to regulate the depth of the cut made by a sweep without interfering with the depth of the cut or draft of the heading-plow. During the growth of cotton and other plants there are stages during which it is of great consequence to plow lightly and at other times heavily.

My invention is described as follows:

In the accompanying drawings, A represents a slotted plow-standard, and B the heading plow-point.

*a* represents the sweep, which may be made of various sizes to suit.

The heading-plow B may be of any size or shape practicable, and the plow-standard A may also be of different sizes to suit and of any suitable material.

*b* represents a broad flat iron, the lower end of which lies between the sweep *a* and the flat iron *c*, that lies close up against the plow-standard A. The lower ends of the said plates *b c* are perforated to receive the bolt *d*, which passes through the heading plow-point B, through the slot in the plow-standard A, through the perforations in said plates, and through the perforations *e* in the sweep *a*, and all are secured together by a proper heel-tap. The said plate *c* hugs closely and fits up against the rear face of said plow-standard, and has a projecting tongue *f*, which is turned at a right angle forward and fits in the slot of the plow-standard A. In large plows, where the said attachment must be correspondingly heavy, I extend the length of the said tongue *f* and provide it with tines *f'*, to be turned over the front edge of the plow-standard A, preventing too much strain on the heel-bolt *d*. Said plate *c* has near its upper end a perforation *g*, the purpose of which is hereinafter explained.

The plate *b*, in addition to the perforation in its lower end, has near its upper end a threaded screw-hole *h*, to receive the threaded pin *i*, having on one end a thumb-handle, the other end terminating in a pin, which fits and turns in a perforation *g*, in the plate *c*. Said pin is hammered down on its end, forming a head, or may have on its end a nut.

The operation of this attachment is as follows: By turning the threaded pin *i* to the left we can bring the plate *b* flat up against the rear face of the plate *c*, and thus set the plow-sweep at a pitch corresponding with the pitch of the heading-plow B, and by turning the said threaded pin to the right the upper end of the said plate *b* will be carried farther and farther back, setting the said sweep at a less and lesser pitch as the said plate is carried back.

Having described my invention, what I claim as new, and desire to secure by Letters Patent, is—

The combination, with a slotted plow-standard, of the perforated plate *c*, fitting against the rear face of the said standard, and having the tongue *f*, fitting in the slot of said standard, and tines *f'*, turning over the front edges of said standard, perforated plate *b*, adapted to fit against the rear face of the said plate *c*, and having the threaded opening *h*, threaded and headed pin *i*, working in the threaded opening *h*, its headed end turning in the perforation *g* of plate *c*, and sweep *a*, bolted to the rear of said plate *b*, substantially as shown and described, and for the purposes set forth.

In testimony whereof I affix my signature in presence of two witnesses.

MICAJAH BOMAN HELLER.

Witnesses:
WILLIAM HENRY FRIERSON,
ROBERT ETHAN FRIERSON.